J. DIETRICH.
WATER GAGE GLASS SHIELD.
APPLICATION FILED AUG. 17, 1914.

1,193,368.

Patented Aug. 1, 1916.
2 SHEETS—SHEET 1.

WITNESSES:
Wm. Geiger
Carrie C. Ranz

INVENTOR.
Julius Dietrich
BY George V. Haight
ATTORNEY

J. DIETRICH.
WATER GAGE GLASS SHIELD.
APPLICATION FILED AUG. 17, 1914.
1,193,368.
Patented Aug. 1, 1916.
2 SHEETS—SHEET 2.
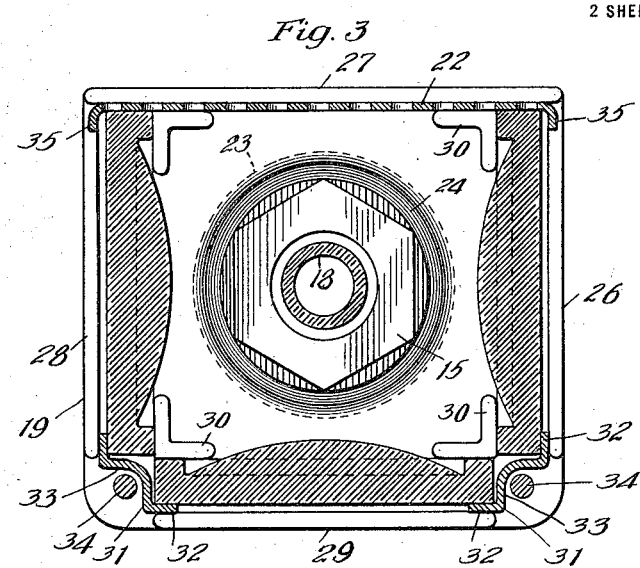
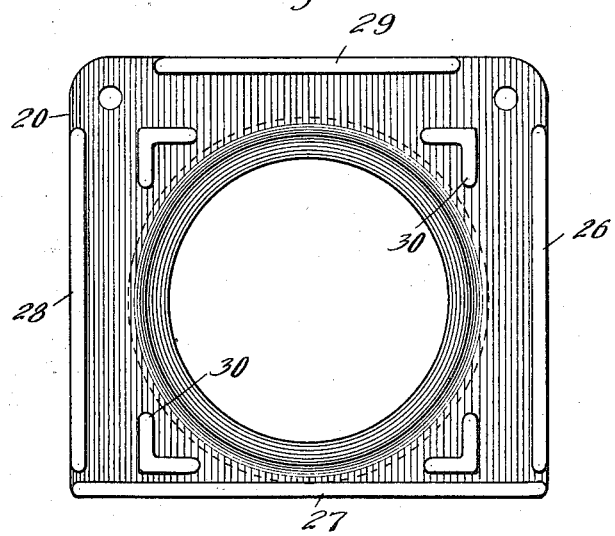
WITNESSES:
INVENTOR.
Julius Dietrich
BY
ATTORNEY

UNITED STATES PATENT OFFICE.

JULIUS DIETRICH, OF LINCOLN, NEBRASKA.

WATER-GAGE-GLASS SHIELD.

1,193,368.

Specification of Letters Patent.

Patented Aug. 1, 1916.

Application filed August 17, 1914. Serial No. 857,068.

*To all whom it may concern:*

Be it known that I, JULIUS DIETRICH, a citizen of the United States, residing at Lincoln, in the county of Lancaster and State of Nebraska, have invented a certain new and useful Improvement in Water-Gage-Glass Shields, of which the following is a full, clear, concise, and exact description, reference being had to the accompanying drawings, forming a part of this specification.

This invention relates to improvements in water gage glass shields.

The object of this invention is to provide a gage glass shield, more particularly adapted for locomotives, which will protect the gage glass while at the same time permitting ready observation of the water therein and furthermore so constructed that in the event of breakage of the glass, the steam may escape but pieces of the broken glass will be prevented from flying in the cab and injuring the engineer or fireman.

Another object of the invention is to provide a shield of the type above indicated which may be readily adjusted and compensated for any variations in the distance between the water glass cocks on the boiler.

Figure 1:
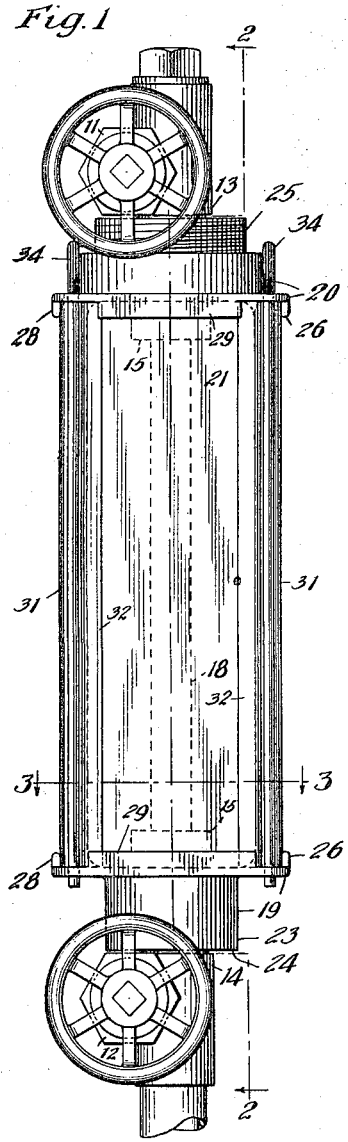
Figure 2:
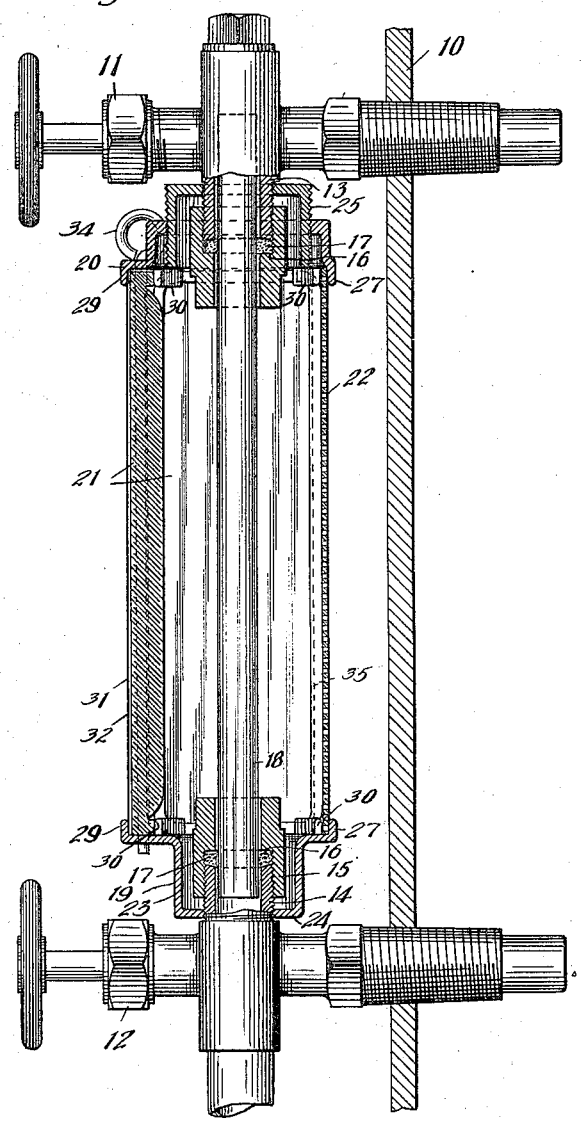

In the drawing forming a part of this specification, Figure 1 is a side elevation of a water gage glass shield embodying my improvements. Fig. 2 is a vertical sectional view taken substantially on the line 2—2 of Fig. 1. Fig. 3 is an enlarged horizontal sectional view taken substantially on the line 3—3 of Fig. 1 and Fig. 4 is an inverted plan view of the upper plate or cap piece employed with my shield.

In the drawing, 10 denotes the end plate of the boiler into which are threaded upper and lower standard water glass cocks 11 and 12. The upper cock 11 is provided with a depending threaded nipple 13 and the lower cock with an upwardly extending correspondingly threaded nipple 14 on which are threaded nuts 15 having internal shoulders 16 between which and the ends of the nipples 13 and 14 is a packing 17 which surrounds the water gage glass 18.

The parts above described are or may be of standard or any desired construction.

The shield for the glass 18 comprises a lower plate 19, which as shown, is substantially rectangular in plan view, see Fig. 3; an upper plate or cap 20 of substantially the same shape as the lower plate 19; three glass panes or members 21—21 arranged edge to edge, and a perforated sheet metal back wall 22. The lower plate 19 is provided with a downwardly extending hollowed cylindrical portion 23, which at its lower end is provided with an inturned flange 24 threaded on the nipple 14. The upper plate or cap 20 is adjustably threaded on the exterior of a threaded bushing 25, which in turn is adjustably threaded on the nipple 13. The plates 19 and 20, on their opposing faces, are each provided with a plurality of ribs 26, 27, 28 and 29 which have spaces therebetween at the corners, the spaces between the ribs 26 and 27 and 28 and 27, being less than the spaces between the ribs 26 and 29 and 28 and 29 for a purpose hereinafter specified. Each plate 19 and 20 is also provided with four right-angle ribs 30—30 arranged at the corner of a square and within the ribs 26, 27, 28 and 29 as clearly shown in Figs. 3 and 4.

The parts are assembled as follows:—The perforated sheet metal back member 22 is first slipped in the spaces provided therefor between the ribs 27 and the adjacent right angle ribs 30, after which the side members or panes of glass 21—21 are slipped in between their corresponding ribs 26 and 28 and the adjacent right angle ribs 30—30 and finally the front pane of glass 21 is placed in position in the space provided for it between the ribs 29 and the adjacent right angle ribs 30. After the parts have been thus put in position, two sheet metal corner clips 31 are sprung into position as indicated most clearly in Fig. 3, each of said clips 31 having edge flanges 32 and a centrally offset portion or trough 33. To hold the various parts in position, pins 34—34 are finally inserted through alined slots in the upper and lower plates 20 and 19 which pins pass along the outside of the clips 31—31 and thus retain all the members in place, and in this connection it will be noted that the perforated sheet metal member 22 is flanged as indicated at 35 along its edges to overlap the adjacent side panes of glass.

As will be evident from the foregoing description, the shield may be readily assembled and disassembled and in the event of breakage of the water glass 18, steam may escape through the perforations in the plate 22 but broken glass will be prevented from flying. By rendering the bushing 25 adjustable on the nipple 13 and the plates 19 and 20 adjustable on the nipple 14 and bushing 25 respectively, it is apparent that any variations in distances between the water glass cocks from the standard distance, may be readily compensated for.

Although I have herein shown and described what I now consider the preferred embodiment of my improvements yet it will be understood that various changes and modifications may be made without departing from the spirit of the invention and all such changes are contemplated as come within the scope of the claims appended hereto.

I claim:—

1. In a device of the character described, the combination with upper and lower water glass cocks having a gage glass extending therebetween, of a bushing adjustably mounted on one of said cocks, and without affecting the attachment of the gage glass thereto, a plate adjustably mounted directly on said bushing, a second plate carried by the other cock, and a plurality of members extending between said plates arranged to inclose the gage glass, some of said members being transparent.

2. In a device of the character described, the combination with upper and lower water glass cocks having a gage glass extending therebetween, of an upper plate carried by the upper cock, a lower plate carried by the lower cock, each of said plates being provided with a plurality of spaced ribs on the opposed faces thereof, a plurality of glass panes extending between said plates and having the upper and lower edges thereof located between some of said ribs, a perforated sheet metal member extending between said plates and having the upper and lower edges thereof located between others of said spaced ribs; said glass panes and perforated sheet metal member being arranged edge to edge and removable from between said plates, and detachable means for retaining said panes and sheet metal member in position.

3. In a device of the character described, the combination with upper and lower water glass cocks having a gage glass extending therebetween, and packing nuts for securing the glass to said cocks, of a shield for said gage glass, and means for supporting said shield, said means including a plate supported by and adjustable relatively to one of said cocks and independently of the packing nut and free from engagement with the packing nut.

4. In a device of the character described, the combination with upper and lower water glass cocks having a gage glass extending therebetween, of a shield for said gage glass including a plurality of glass panes, and means for removably supporting said glass panes in position, said means including upper and lower plates carried directly respectively by said upper and lower cocks, each of said plates on its inner face being provided with a plurality of spaced ribs between which the upper and lower edges of said glass panes are adapted to be inserted, and sheet metal corner strips overlapping the adjacent vertical edges of said glass panes.

5. In a device of the character described, the combination with upper and lower cocks having a gage glass extending therebetween and attached thereto by packing nuts, of a shield for said gage glass, and means for adjustably mounting said shield, said means including a substantially cup shaped bushing adjustably mounted on one of said cocks, a plate adjustably threaded on the exterior of said bushing, and a second plate threaded on the nipple of the other cock, said plates being provided with means for retaining the shield in place.

6. In a device of the character described, the combination with upper and lower cocks having a gage glass extending therebetween and attached thereto by packing nuts, of a shield for said gage glass, and means for adjustably mounting said shield without adjusting said nuts, said means including an adjustably mounted bushing, a plate adjustably mounted on said bushing and a second adjustably mounted plate, said shield extending between said plates and supported and carried thereby.

JULIUS DIETRICH.

Witnesses:
 HOWARD STAFFORD,
 FRANK M. SPRAGUE.